US011607636B2

(12) United States Patent
Lei

(10) Patent No.: US 11,607,636 B2
(45) Date of Patent: Mar. 21, 2023

(54) AIR PURIFYING PROMPTING SYSTEM

(71) Applicant: Shenzhen Chenbei Technology Co., Ltd., Shenzhen (CN)

(72) Inventor: Tan Lei, Shenzhen (CN)

(73) Assignee: Shenzhen Chenbei Technology Co., Ltd., Shenzhen (CN)

( * ) Notice: Subject to any disclaimer, the term of this patent is extended or adjusted under 35 U.S.C. 154(b) by 540 days.

(21) Appl. No.: 16/779,537

(22) Filed: Jan. 31, 2020

(65) Prior Publication Data

US 2020/0246742 A1 Aug. 6, 2020

(30) Foreign Application Priority Data

Jan. 31, 2019 (CN) .......................... 201910098143.3
Jan. 31, 2019 (CN) .......................... 201920183394.7

(51) Int. Cl.
*B01D 46/00* (2022.01)
*H04W 4/80* (2018.01)
*B01D 46/46* (2006.01)
*F02M 35/09* (2006.01)

(52) U.S. Cl.
CPC ......... *B01D 46/0086* (2013.01); *B01D 46/46* (2013.01); *F02M 35/09* (2013.01); *H04W 4/80* (2018.02)

(58) Field of Classification Search
CPC ..... B01D 46/0086; B01D 46/46; H04W 4/80; F02M 35/09
See application file for complete search history.

(56) References Cited

U.S. PATENT DOCUMENTS

| | | | |
|---|---|---|---|
| 10,767,876 B2* | 9/2020 | Kelly | ..................... B01D 46/46 |
| 11,369,909 B2* | 6/2022 | McLeod | ............. B01D 46/0036 |
| 2008/0206092 A1* | 8/2008 | Crapser | ..................... A61L 9/04 |
| | | | 422/123 |
| 2017/0189844 A1* | 7/2017 | McLeod | ................. B01D 46/46 |
| 2017/0328591 A1* | 11/2017 | Kelly | ................. G01N 33/0073 |
| 2017/0341001 A1* | 11/2017 | Jousma | .............. B01D 46/0086 |
| 2018/0154297 A1* | 6/2018 | Maletich | ................. F24F 8/158 |

* cited by examiner

*Primary Examiner* — Sisay Yacob
(74) *Attorney, Agent, or Firm* — Tsz Lung Yeung

(57) ABSTRACT

An air purifying prompting system includes an air purifying system and a prompting server wirelessly communicated with the air purifying system. The air purifying system includes an air purifying processor, an air filter communicating with the air purifying processor, a positioning module for positioning the air purifying system, and an air quality sensor for detecting air quality around the air purifying system, wherein the prompting server is arranged to generate an air filter usage time data. The air filter usage time is used to activate generation of air filter prompting signals to the air purifying system.

16 Claims, 6 Drawing Sheets

| Color of light indicator | PM2.5 range |
|---|---|
| Blue | 0-75 |
| Green | 75-115 |
| Yellow | 115-150 |
| Red | 150 or more |

Fig. 3

| Color of light indicator | PM2.5 range |
|---|---|
| Blue | 0-79 |
| Green | 80-119 |
| Yellow | 120-150 |
| Red | 151 or more |

Fig. 4

| Color of light indicator | PM2.5 range |
|---|---|
| Blue | 0-70 |
| Green | 71-110 |
| Yellow | 111-145 |
| Red | 146 or more |

Fig. 5

| PM2.5 range change-increase | Color of light indicator |
|---|---|
| PM2.5 value is smaller than 30, stay the same | Blue |
| Current average (within 20 seconds) is greater than the previous average of 15 | Green |
| Current average (within 20 seconds) is greater than the previous average of 30 | Yellow |
| PM2.5 range change-decrease | Color of light indicator |
| Decrease in the interval | Unchanged, stay in blue |

Fig. 6

| PM2.5 range change-increase | Color of light indicator |
|---|---|
| Current average (within 20 seconds) is greater than the previous average of 15 | Yellow |
| Current average (within 20 seconds) is greater than the previous average of 30 | Red |
| PM2.5 range change-decrease | Color of light indicator |
| Decrease in the interval | Unchanged, stay in green |

Fig. 7

| PM2.5 range change-increase | Color of light indicator |
|---|---|
| Current average (within 20 seconds) is greater than the previous average of 15 | Red |
| Current average (within 20 seconds) is greater than the previous average of 30 | Red |
| PM2.5 range change-decrease | Color of light indicator |
| Decrease in the interval | Unchanged, stay in yellow |

Fig. 8

| PM2.5 range change-increase | Color of light indicator |
|---|---|
| Increase in the interval | Unchanged, stay in red |
| PM2.5 range change-decrease | Color of light indicator |
| Decrease in the interval | Unchanged, stay in red |

Fig. 9

| Current interval | Current hierarchical color | Threshold setting | Enter the regular mode and change color |
|---|---|---|---|
| 0-75 | Blue/green/yellow | 70 | Enter the regular mode to change color-blue |
| 0-75 | Blue/green/yellow | 80 | Enter the regular mode to change color-green |
| 75-115 | Green/yellow/red | 70 | Enter the regular mode to change color-blue |
| 75-115 | Green/yellow/red | 120 | Enter the regular mode to change color-yellow |
| 115-150 | Yellow/red | 110 | Enter the regular mode to change color-green |
| 115-150 | Yellow/red | 151 | Enter the regular mode to change color-red |
| 150 or more | Red | 145 | Enter the regular mode to change color-yellow |
| 150 or more | Red | 500 | Enter the regular mode to change color-red |

Fig. 10

AIR PURIFYING PROMPTING SYSTEM

CROSS REFERENCE TO RELATED APPLICATION

This is a non-provisional application which claims priority to two Chinese applications having application numbers of CN 201910098143.3 and CN201920183394.7, and filing dates of Jan. 31, 2019 and Jan. 31, 2019 respectively, the entire contents of these foreign applications is hereby incorporated by reference.

BACKGROUND OF THE PRESENT INVENTION

Field of Invention

The present invention relates to a prompting system, and more particularly to an air purifying prompting system which is capable of maintaining the air purifying system and optimizing an operation of the air purifying system.

Description of Related Arts

The rapid development of technology is often burdensome to the environment. People are seeking many meaningful solutions in order to address the threat of global warming. Particularly, there has been a growing interest to improve environmental air quality in homes and commercial buildings such as offices, restaurants, hospitals, and the like. There has been a significantly increased demand for an indoor air purifying or filtering system for improving an indoor air quality as more information has been made to the public concerning the hazards of the indoor air pollution.

Generally speaking, a conventional air purifying system may comprise an air filter for filtering out unwanted substances, such as harmful debris, dirt and contaminants, in the air when passing through the air filter. The air filter must be replaced regularly. Otherwise, the dirty and clogged air filter not only forms a strong barrier to circulating air but also encourages the growth of mold and bacteria to introduce more pollutants and allergens into the indoor air. Currently, most air purifying system provides a manufacturing suggestion for air filter replacement. For example, the air purifying system will generate a light signal for air filter replacement after 2000 usage hours or a three-month period. However, the air qualities in different areas or different zones are different, such that the air filter replacement suggestion is unreasonable and impractical due to different situations. In other words, the air filter replacement suggestion from the air purifying system is not depended on the actual usage or condition of the air filter.

As a result, there is a need to develop a prompting system which may assist maintaining and optimizing of air purifying system.

SUMMARY OF THE PRESENT INVENTION

Certain variations of the present invention provide an air purifying prompting system which is capable of maintaining the air purifying system and optimizing an operation of the air purifying system.

Certain variations of the present invention provide an air purifying prompting system, wherein an air filter prompting signal regarding a data of remaining time of said air filter is generated to accurately promote the replacement of the air filter.

Certain variations of the present invention provide an air purifying prompting system, wherein the air filter prompting signal is generated based on a regional air data and a local air data to accurately promote the replacement of the air filter.

Certain variations of the present invention provide an air purifying prompting system which is a user friendly system and an environmental friendly system.

Certain variations of the present invention provide an air purifying prompting system which is easy to operate while being cost effective.

In one aspect of the present invention, it provides an air purifying prompting system, comprising:

an air purifying system which comprises an air purifying processor, an air filter communicating with the air purifying processor, a positioning module operatively connected to the air purifying processor for positioning the air purifying system, and an air quality sensor operatively connected to the air purifying processor for detecting air quality around the air purifying system, wherein the air purifying processor is arranged to generate local air data; and a prompting server which is communicated with the air purifying system, wherein the prompting server comprises a data processing platform to determine air filter usage time to generate data of remaining time of the air filter based on said local air data so as to generate an air filter prompting signal regarding the data of remaining time of the air filter.

In another aspect of the present invention, it provides an air purifying prompting method via an air purifying prompting system which comprises an air purifying system and a prompting server, comprising the steps of:

(a) generating an air filter usage time data of the air purifying system based on data obtained by the air purifying system and the prompting server;

(b) generating data of remaining time of the air filter by a data processing platform of the prompting server based on the air filter usage time data;

(c) wirelessly sending out an air filter prompting signal by the prompting server regarding the data of remaining time of the air filter to the air purifying system; and (d) wirelessly receiving the air filter prompting signal by the air purifying system regarding the data of remaining time of the air filter.

This summary presented above is provided merely to introduce certain concepts and not to identify any key or essential features of the claimed subject matter.

BRIEF DESCRIPTION OF THE DRAWINGS

FIG. 3 is a table illustrating an example of air pollution of PM2.5 under the regular color changing mode according to the preferred embodiment of the present invention.

FIG. 4 is a table illustrating the color of the light signal of the light indicator corresponding to the PM2.5 level interval 1 by adding a positive 5 delay range.

FIG. 5 is a table illustrating the color of the light signal of the light indicator corresponding to the PM2.5 level interval 1 by adding a negative 5 delay range.

FIG. 6 is a table illustrating the hierarchical color changing for the PM2.5 level in the range of 0 to 75.

FIG. 7 is a table illustrating the hierarchical color changing for the PM2.5 level in the range of 75 to 115.

FIG. 8 is a table illustrating the hierarchical color changing for the PM2.5 level in the range of 115 to 150.

FIG. 9 is a table illustrating the hierarchical color changing for the PM2.5 level in the range of 150 and more.

FIG. 10 is a table illustrating the settings for switching from the hierarchical color changing mode to the regular color changing mode according to the preferred embodiment of the present invention.

DETAILED DESCRIPTION OF THE PREFERRED EMBODIMENT

Figure 1:
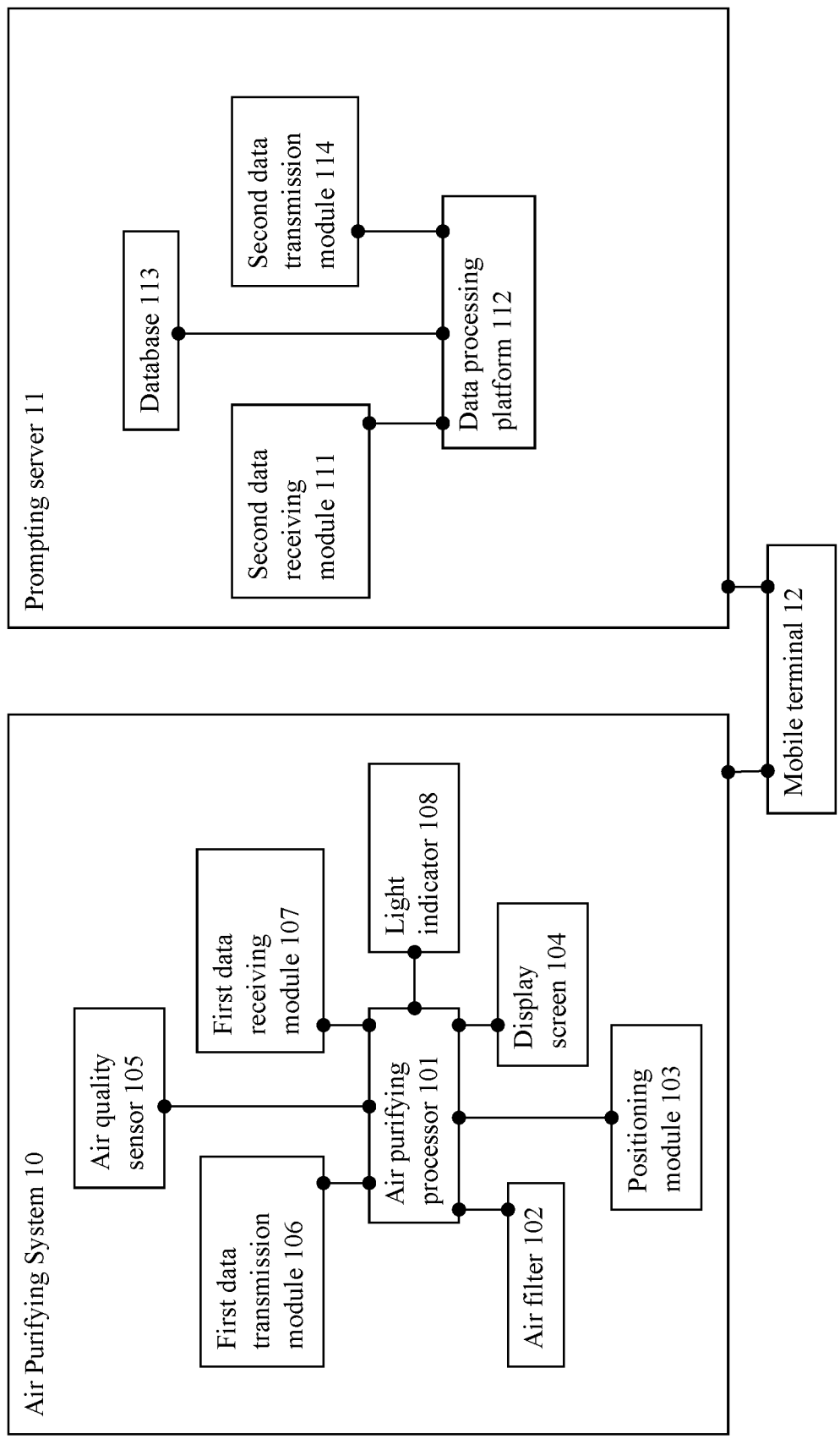
FIG. 1 is a block diagram illustrating the structure of an air purifying prompting system according to a preferred embodiment of the present invention.

The following detailed description of the preferred embodiment is the preferred mode of carrying out the invention. The description is not to be taken in any limiting sense. It is presented for the purpose of illustrating the general principles of the present invention.

Referring to FIG. 1 to FIG. 10 of the drawings, an air purifying prompting system according to a preferred embodiment of the present invention is illustrated. Broadly, the air purifying prompting system 1 may comprise an air purifying system 10 and a prompting server 11. The air purifying system 10 may be a HEPA air system or an air purifiers sanitizing air by producing ozone, UV light, and/or negative ions.

The air purifying system 10 may comprise an air purifying processor 101, an air filter 102 communicating with the air purifying processor 101, a positioning module 103 operatively connected to the air purifying processor 101 for positioning the air purifying system 10, a display screen 104 operatively connected to the air purifying processor 101 for displaying a remaining usage time of the air filter 102, an air quality sensor 105 operatively connected to the air purifying processor 101 for detecting air quality in the environment around the air purifying system 10, a first data transmission module 106 operatively connected to the air purifying processor 101 for wirelessly sending local air data to the prompting server 11, and a first data receiving module 107 operatively connected to the air purifying processor 101 for receiving data of remaining time of the air filter 102 sent by the prompting server 11.

In this preferred embodiment, the air quality sensor 105 may be a dust sensor for detecting dust concentration in the environment in order to determine the air quality in the environment around the air purifying system 10.

As shown in FIG. 1 of the drawings, the prompting server 11 may comprise a second data receiving module 111 connected to the first data transmission module 106 for receiving local data sent from the air purifying system 10, a data processing platform 112 operatively connected to the second data receiving module 111 for processing and calculating the data of remaining time of the air filter 102 based on local air data received by the second data receiving module 111, a database 113 operatively connected to the data processing platform 112 for storing the data received by the second data receiving module 111 and the data after being processed by data processing platform 112, and a second data transmission module 114 connected to the data processing platform 112 for sending out an air filter prompting signal regarding the data of remaining time of the air filter 102. Processed data, i.e. the data after being processed by data processing platform 112, may be configured as the processed data of remaining time of the air filter 102 generated by the data processing platform 112. The database 113 may be arranged to store the data before and after being processed. The second data transmission module 114 may be arranged for sending a push message as the air filter prompting signal regarding the data of remaining time of the air filter 102.

According to the preferred embodiment of the present invention, the air purifying prompting system 1 may further comprise a mobile terminal 12 operatively connected to the air purifying system 10 and the prompting server 11 as a bridge therebetween for receiving the air filter prompting signal from the prompting server 11. Moreover, the air purifying system 10 may further comprise a light indicator 108 operatively linked to the air purifying processor 101 for indicating the current air quality in response to the air quality sensor 105.

The air purifying system 10 and the prompting server 11 may be connected wirelessly, such as through Internet. Therefore, the first data transmission module 106 may wirelessly upload the data obtained by the air purifying processor 101 to the second data receiving module 111. The first data receiving module 107 may wirelessly receive the data of remaining time of the air filter 102 sent by the second data transmission module 114.

The positioning module 103 may comprise a GPS (Global Positioning System) module for locating the air purifying system 10. Likewise, the positioning module 103 may be configured as other positioning modules such as Beidou module, a Galileo module, a GLONASS module, etc., which should not be limited in the present invention.

The first data transmission module 106 may be a Wi-Fi (Wireless-Fidelity) module. The first data transmission module 106 may be a BLUETOOTH module or an infrared module. When the first data transmission module 106 is a BLUETOOTH module or an infrared module, the air purifying system 10 may be arranged to initially send the data to the mobile terminal 12, wherein the mobile terminal 12 may then forward the date to the prompting server 11. Likewise, the prompting server 11 may send the data of remaining time of the air filter 102 to the mobile terminal 12 in order to forward the data to the air purifying system 10.

Figure 2:
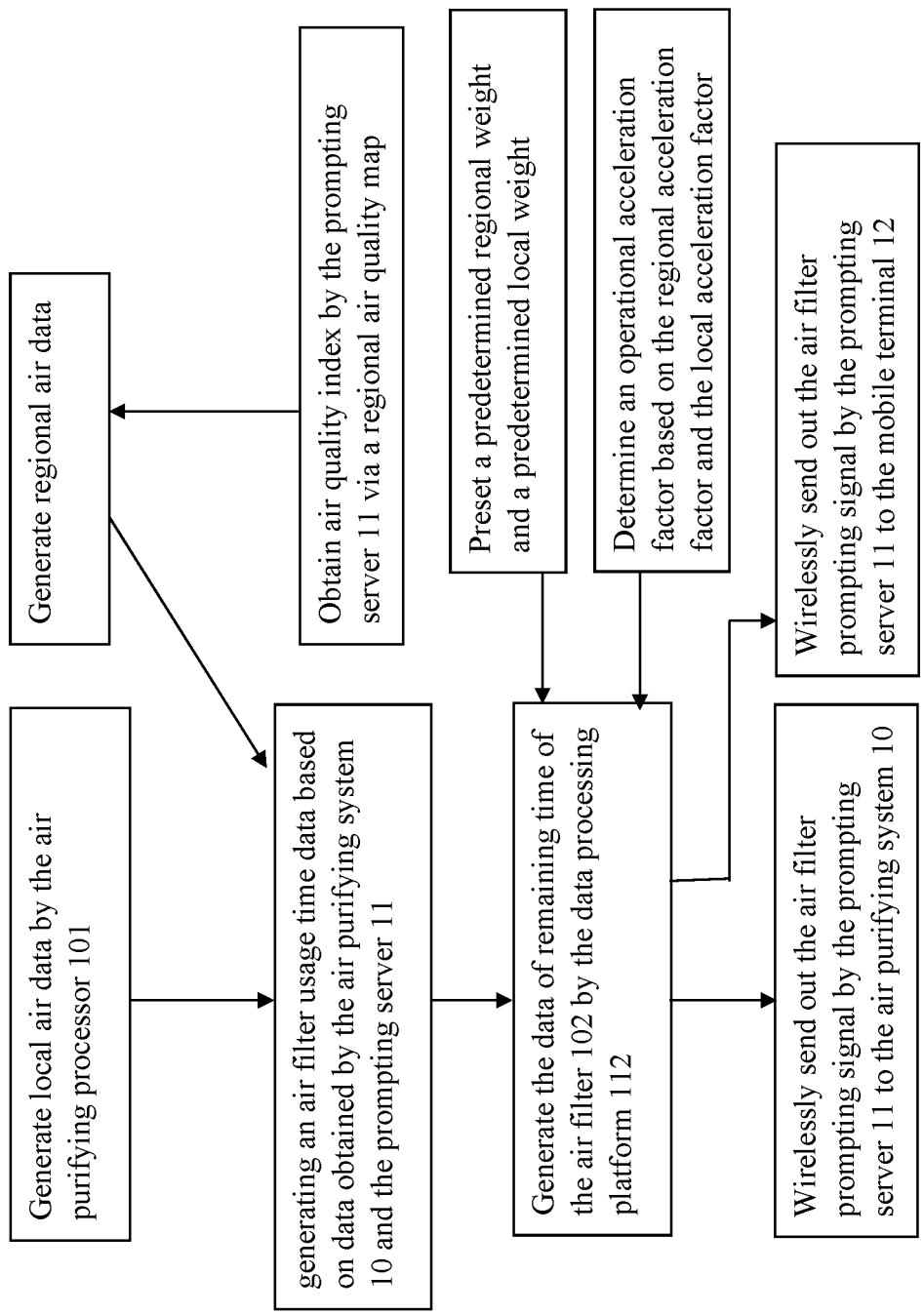
FIG. 2 is a flow diagram illustrating the method of the air purifying prompting system according to the preferred embodiment of the present invention.

As shown in FIG. 2 of the drawings, the present invention may further provide an air purifying prompting method which may comprise the steps of:

(a) generating an air filter usage time data of the air purifying system 10 based on data obtained by the air purifying system 10 and the prompting server 11;

(b) generating a data of remaining time of the air filter by a data processing platform 112 of the prompting server 11 based on the air filter usage time data;

(c) wirelessly sending out an air filter prompting signal by the prompting server 11 regarding the data of remaining time of the air filter to the air purifying system 10; and (d) wirelessly receiving the air filter prompting signal by the air purifying system 10 regarding the data of remaining time of the air filter.

After locating the working location of the data processing platform 112 (for the purpose of collecting the regional air quality index of the environment), and after detecting the air quality, such as dust concentration, from the air quality sensor 105, the air filter usage time data may be generated, wherein the remaining usage time of the air filter 102 of the air purifying system 10 described above may be determined and calculated. The calculation process may be described as follows:

Firstly, via the positioning module 103, an air quality index regarding the working location of the air purifying system 10 may be obtained based on the regional air quality map. The air quality index may be obtained from any provider such as government weather bureau. For example, if the work location of the air purifying system 10 is in the United States, the US air quality map may be obtained first, and then the air quality corresponding to the current work location of the air purifying system 10 may be determined in the US regional air quality map through any weather website being linked to the prompting server 11. The air quality index may be obtained by the prompting server 11.

In other words, the step (a) mentioned above may further comprise the steps of:

(a.1) generating the regional air data by locating the position of the air purifying system 10 and collecting the regional air quality index. The position of the air purifying system 10 may be sent to the prompting server 11 so that the prompting server 11 may obtain a corresponding regional air data through predetermined external sources, such as from Internet. For example, the prompting server 11 may be able to link to a weather website to collect the regional quality index according to the regional air quality map;

(a.2) generating the local air data by detecting air quality around the air purifying system 10 by the air quality sensor 105 of the air purifying system 10; and (a.3) wirelessly sending the local air data to the prompting server 11; and (a.4) combining the regional air data and the local air data in the prompting server 11 to generate said air filter usage time data.

Then, via the above regional air quality map, a regional air data of the area where the working location of the air purifying system 10 is located may be roughly determined. Via the detection of the air quality, i.e. the dust concentration, by the air quality sensor 105, a local air data of the working location of the air purifying system 10 is located may be roughly determined. Accordingly, the regional air data and the local air data may be considered as operational factors for the operation of the air purifying system 10 to generate the air filter usage time data by combing the regional air data and the local air data. For example, supposed that the air purifying system 10 is located at house A with an address of 123 street, B city of a C country. Through the regional air quality map, the regional air data may be determined around 123 street.

Moreover, through the detection of air quality, the local air data may be directly determined at house A. Due to the air circulation, fresh air is guided to enter into house A from 123 street. As a result, the regional air data and the local air data will affect the operation of the air purifying system 10. Specifically, when the air quality is getting worse, the depletion of the air filter 102 may be increased. In other words, the service life span of the air filter 102 may be shortened due to the poor air quality. When the air quality is getting better, the depletion of the air filter 102 may be decreased. Thus, the service life span of the air filter 102 may be prolonged due to the good air quality. Therefore, based on the regional air data and the local air data, an acceleration factor of the usage time of the air filter 102 of the air purifying system 10 may be generated. The predetermined weight may be set in advance through an experience threshold of the prompting server 11.

It should be appreciated that the experience threshold may be set by the user to the prompting server 11 based on the actual situation, which should not be limited in the present invention. The predetermined regional weight $W_{regional}$ may be set to be 0.4 in the data processing platform 112 based on the acceleration factor through the regional air data. The predetermined local weight $W_{local}$ may be set to be 0.6 in the data processing platform 112 based on the acceleration factor through the local air data. The following is a specific example: if the air quality index of the above working location is found to be X1 based on the regional air quality map, the regional acceleration factor $F_{regional}$ of the usage time of the air filter 102 is determined to be 2 according to the regional air data. Based on the above local air data that the air quality of the working location is good, the local acceleration factor $F_{local}$ of the usage time of the air filter 102 is determined to be 1 according to the local air data. Then, by calculating the predetermined weights, an operational acceleration factor $F_{operational}$ of the usage time of the air filter 102 can be determined as follows:

$$F_{operational}=F_{regional}\times W_{regional}+F_{local}\times W_{local}$$

That is: $F_{operational}=2\times 0.4+1\times 0.6=1.4$. When the air purifying system 10 is operated for 1 hour under the current condition, the actual loss of the air filter 102 is determined to be 1.4 hours. Therefore, the operational acceleration factor $F_{operational}$ represents the usage time of the air filter 102 of the air purifying system 10.

Finally, a remaining usage time of the air filter 102 may be predicted according to the operational acceleration factor $F_{operational}$. Specifically, the previous remaining usage time of the air filter 102 before starting the operation of the air purifying system 10 may be initially read. Then, the working hours of the current operation of the air purifying system 10 may be counted. The actual loss of the air filter 102 for the current operation may be determined by multiplying the current working time of the air purifying system 10 by the operational acceleration factor. Finally, the latest remaining usage time of the air filter 102 of the air purifying system 10 may be determined by deducting the current remaining usage time of the air filter 102 from the previous remaining usage time of the air filter 102. For example, assuming the previous remaining usage time of the air filter 102 before starting the operation of the air purifying system 10 is initially read to be 1000 hours, through the above example, the current acceleration factor may be determined to be 1.4. When the air purifying system 10 is operated for 1 hour under the current condition, the current actual loss of the air filter 102 may be determined to be 1.4 hours. Then, latest remaining usage time of the air filter 102 of the air purifying system 10 may be determined by deducting 1.4 hours from 1000 hours, such that the latest remaining usage time of the air filter 102 is determined to be 998.6 hours. Note that the operational acceleration factor $F_{operational}$ may be determined by the prompting server 11 after receiving all the relevant data from the air purifying system 10 and the external weather/air quality source.

Specifically, the prompting server 11 may be able to generate the push prompting message once the operation of the air purifying system 10 is completed. At the same time, the prompting server 11 may also be able to generate the push prompting message to the mobile terminal 12 regarding the air purifying system 10. Practically, the air purifying system 10 may be considered as a smart home appliance, wherein the user may be able to download a corresponding application into his or her Internet enabled device, such as a mobile phone to form the mobile terminal 12 as a client terminal, such that the mobile phone, as the mobile terminal 12, may be wirelessly connected to the prompting server 11. Therefore, the mobile phone of the user may be able to receive the prompting message sent by the prompting server 11 to associate with the air purifying system 10, such that the user may be able to easily and conveniently view and notify the status of the air filter 102.

According to the present invention, the light indicator 108, preferably a LED, may be arranged to generate a flashing color light signal as an example to indicate the air quality at the working location of the air purifying system 10. Different flashing rates and/or colors may be selectively set as different flashing modes for the light indicator 108. Specifically, the flashing modes may be a regular color changing mode and a hierarchical color changing mode. For an example of air pollution of PM2.5 (Fine Particulate Matter), under the regular color changing mode, the light indicator 108 may be activated and set to generate the light signal as shown in FIG. 3 of the drawings.

However, when using the table as shown in FIG. 3 of the drawings, the light indicator 108 may frequently flashing due to the fluctuation of the air quality detection. For example, when the air quality detection is fluctuated between two different levels, the light from the light indicator 108 may keep frequently flashing, so as to shorten the service life span of the light indicator 108. Therefore, by adding a delay of the light signal, the operation of the light indicator 108 may be more stable. Specifically, when the PM2.5 level increases, the color of the light signal of the light indicator 108 corresponding to the PM2.5 level interval is shown in FIG. 4.

When the PM2.5 level decreases, the color of the light signal of the light indicator 108 corresponding to the PM2.5 level interval is shown in FIG. 5.

It is worth mentioning that the tables in FIG. 4 and FIG. 5 of the drawings may be modified from the table in FIG. 3 by adding the delay feature. Particularly, the table in FIG. 4 may be modified from the table in FIG. 3 by adding a positive 5 delay range. The table in FIG. 5 may be modified from the table in FIG. 3 by adding a negative 5 delay range. For example, in view of FIG. 3, if the detected PM2.5 level increases from 74 to 76 and then drops to 73, the indicator light 108 may be activated to generate the light signal with color changing from blue to green and then to blue. In response to the FIG. 4 and FIG. 5 of the drawings, if the detected PM2.5 level increases from 74 to 76 and then drops to 73, the indicator light 108 may be activated to constantly generate a blue light signal.

Specifically, taking the same PM2.5 as an example, under the hierarchical color changing mode, the light signal of the indicator light 108 may be shown in the tables illustrated in FIG. 6 to FIG. 9 of the drawings.

Accordingly, the table in FIG. 6 shows the hierarchical color changing for the PM2.5 level in the range of 0 to 75. The table in FIG. 7 shows the hierarchical color changing for the PM2.5 level in the range of 75 to 115. The table in FIG. 8 shows the hierarchical color changing for the PM2.5 level in the range of 115 to 150. The table in FIG. 9 shows the hierarchical color changing for the PM2.5 level in the range of 150 or more.

Specifically, the indicator light 108 of the air purifying system 10 may be selectively switched in the regular color changing mode and the hierarchical color changing mode, wherein the settings for switching from the hierarchical color changing mode to the regular color changing mode are as shown in the table in FIG. 10.

As shown in FIG. 10 of the drawings, under the hierarchical color changing mode, once the PM2.5 level exceeds the preset threshold as shown in the table in FIG. 10 within the preset range, the regular color changing mode is immediately selected and at the same time, the color changing of the light indicator 108 may be simultaneously operated as shown in the table in FIG. 10. When the light indicator 108 is operated under the regular color changing mode for a preset period of time, the light indicator 108 may be immediately switched to the hierarchical color changing mode.

It can be understood that, through the present invention, the air filter will not be reminded for being replaced according to the conventional fixed time period. In view of the present invention, the air purifying system 10 may be operated under the actual air quality in the environment by collecting data from the regional air quality map of the working location and the working condition of the air quality sensor built in the air purifying system, so as to dynamically calculate the remaining usage time of the air filter. As a result, the prompting signal may be correspondingly generated in response to the actual usage condition of the air filter in order to prompt the user to replace the air filter in a reasonable manner so as to optimize an operation of the air purifying system.

The present invention, while illustrated and described in terms of a preferred embodiment and several alternatives, is not limited to the particular description contained in this specification. Additional alternative or equivalent components could also be used to practice the present invention.

What is claimed is:

1. An air purifying prompting method via an air purifying prompting system which comprises an air purifying system and a prompting server, comprising the steps of:
   (a) generating an air filter usage time data of said air purifying system based on data obtained by said air purifying system and said prompting server;
   (b) generating data of remaining time of said air filter by a data processing platform of said prompting server based on said air filter usage time data;
   (c) wirelessly sending out an air filter prompting signal by said prompting server regarding said data of remaining time of said air filter to said air purifying system; and
   (d) wirelessly receiving said air filter prompting signal by said air purifying system regarding said data of remaining time of said air filter;
   (e) wirelessly connecting a mobile terminal to said air purifying system and said prompting server for receiving said air filter prompting signal therefrom, wherein the step (a) further comprises the steps of:
   (a.1) generating a regional air data by said prompting server based on a position of said air purifying system and collecting a regional air quality index for said position of said air purifying system;
   (a.2) generating a local air data by detecting air quality around said air purifying system by an air quality sensor of said air purifying system;
   (a.3) wirelessly sending said local air data to said prompting server; and
   (a.4) combining said regional air data and said local air data in said prompting server to generate said air filter usage time data.

2. The air purifying prompting method, as recited in claim 1, wherein said air quality sensor is a dust sensor for detecting dust concentration around said air purifying system.

3. The air purifying prompting method, as recited in claim 2, further comprising a step of indicating a current air quality in response to said air quality sensor by a light indicator of said air purifying system.

4. The air purifying prompting method, as recited in claim 3, wherein said air purifying system further comprises a first data transmission module operatively connected to said air purifying processor for wirelessly sending said local air data to said prompting server in said step (a.3), and a first data receiving module operatively connected to said air purifying processor for receiving said data of remaining time of the said filter sent by the prompting server in said step (c).

5. The air purifying prompting method, as recited in claim 4, further comprising a step of displaying a remaining usage time of said air filter by a display screen of said air purifying processor.

6. The air purifying prompting method, as recited in claim 5, wherein said prompting server further comprises a second data receiving module connected to said first data transmission module for receiving said local air data in said step (a), and a second data transmission module connected to said data processing platform for sending out said air filter prompting signal in the step (d).

7. The air purifying prompting method, as recited in claim 6, further comprising a step of storing said filter usage time data and said data of remaining time of said air filter by a database of said prompting server.

8. The air purifying prompting method, as recited in claim 7, wherein said air purifying system and said prompting server are wirelessly connected through at least one of internet connection, "BLUETOOTH" connection and an infrared connection.

9. An air purifying prompting system, comprising:
an air purifying system which comprises an air purifying processor, an air filter communicating with said air purifying processor, a positioning module operatively connected to said air purifying processor for positioning said air purifying system, and an air quality sensor operatively connected to said air purifying processor for detecting air quality around said air purifying system, wherein said air purifying processor is arranged to generate local air data; and
a prompting server which is communicated with said air purifying system, wherein said prompting server comprises a data processing platform arranged to determine air filter usage time to generate data of remaining time of said air filter based on said local air data so as to generate an air filter prompting signal regarding said data of remaining time of said air filter;
a mobile terminal wirelessly connected to said air purifying system and said prompting server for receiving said air filter prompting signal therefrom; and
a first data transmission module operatively connected to said air purifying processor for uploading said local air data to said prompting server, and a first data receiving module operatively connected to said air purifying processor for receiving said data of remaining time of the said filter sent by the prompting server.

10. The air purifying prompting system, as recited in claim 9, wherein said air purifying system further comprises a display screen operatively connected to said air purifying processor for displaying a remaining usage time of said air filter.

11. The air purifying prompting system, as recited in claim 10, wherein said air quality sensor is a dust sensor for detecting dust concentration around said air purifying system.

12. The air purifying prompting system, as recited in claim 11, wherein said air filter usage time data is combined by a regional air data generated by said positioning module and a local air data generated by said air quality sensor.

13. The air purifying prompting system, as recited in claim 12, wherein said air purifying system further comprises a light indicator operatively linked to said air purifying processor for indicating a current air quality in response to said air quality sensor.

14. The air purifying prompting system, as recited in claim 13, wherein said prompting server further comprises a second data receiving module connected to said first data transmission module for receiving said local air data sent from said air purifying system, and a second data transmission module connected to said data processing platform for sending out said air filter prompting signal.

15. The air purifying prompting system, as recited in claim 14, wherein said prompting server further comprises a database operatively connected to said data processing platform for storing said filter usage time data and said data of remaining time of said air filter.

16. The air purifying prompting system, as recited in claim 15, wherein said air purifying system and said prompting server are connected wirelessly, such that said local air data is wirelessly sent from said air purifying system to said prompting server while said air filter prompting signal is wirelessly sent to said air purifying system from said prompting server.

* * * * *